United States Patent [19]
Suykens

[11] 3,847,290
[45] Nov. 12, 1974

[54] BULK SHIP UNLOADER

[75] Inventor: Matthieu Suykens, Belleville, Ontario, Canada

[73] Assignee: Borg-Warner (Canada) Ltd., Oakville, Ontario, Canada

[22] Filed: Sept. 26, 1973

[21] Appl. No.: 400,988

Related U.S. Application Data

[63] Continuation of Ser. No. 217,344, Jan. 12, 1972, abandoned.

[52] U.S. Cl. .................................. 214/15 E, 198/94
[51] Int. Cl. .............................................. B65g 63/00
[58] Field of Search ........ 214/14, 15 R, 15 D, 15 E; 198/94

[56] References Cited
UNITED STATES PATENTS

| | | |
|---|---|---|
| 1,361,832 | 12/1920 | Crilly .................................. 198/94 X |
| 3,144,142 | 8/1964 | Wallace, Jr. ...................... 214/15 E |
| 3,362,546 | 1/1968 | Sale .................................... 214/14 |
| 3,387,721 | 6/1968 | Ludwig .......................... 214/15 E X |

*Primary Examiner*—Frank E. Werner
*Attorney, Agent, or Firm*—Arthur M. Streich

[57] ABSTRACT

Apparatus for unloading or reclaiming bulk material from the hold of a ship comprises a plurality of side-by-side bucket elevators which operate when in horizontal position longitudinally of the hold and which are pivotable toward a substantially vertical position and which discharge into a cross conveyor belt means which in turn discharges into a longitudinal belt conveyor to carry material from the hold. The bucket elevator means and the conveyor belt means are trolley mounted to be movable longitudinally of the hold.

1 Claim, 3 Drawing Figures

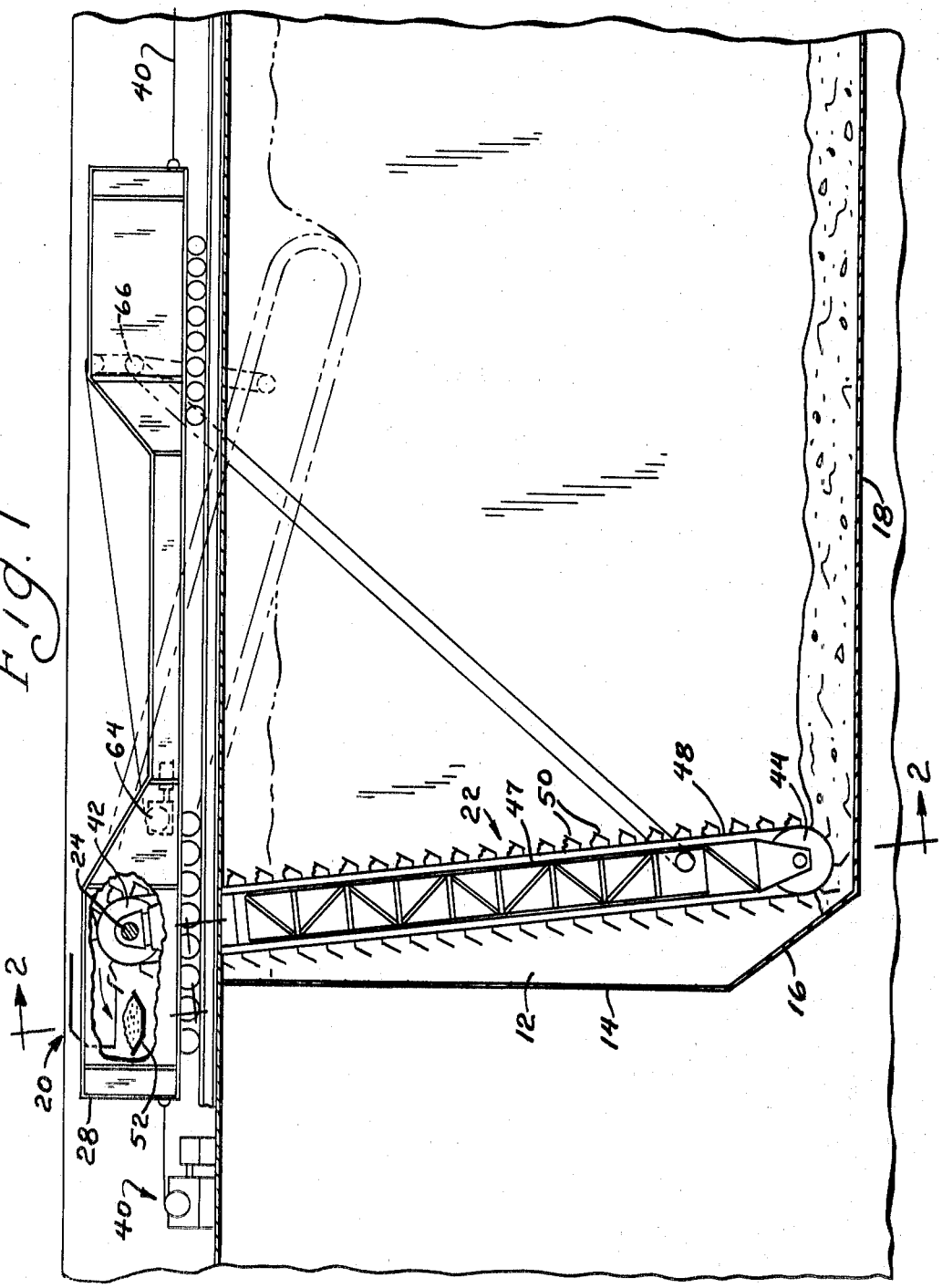

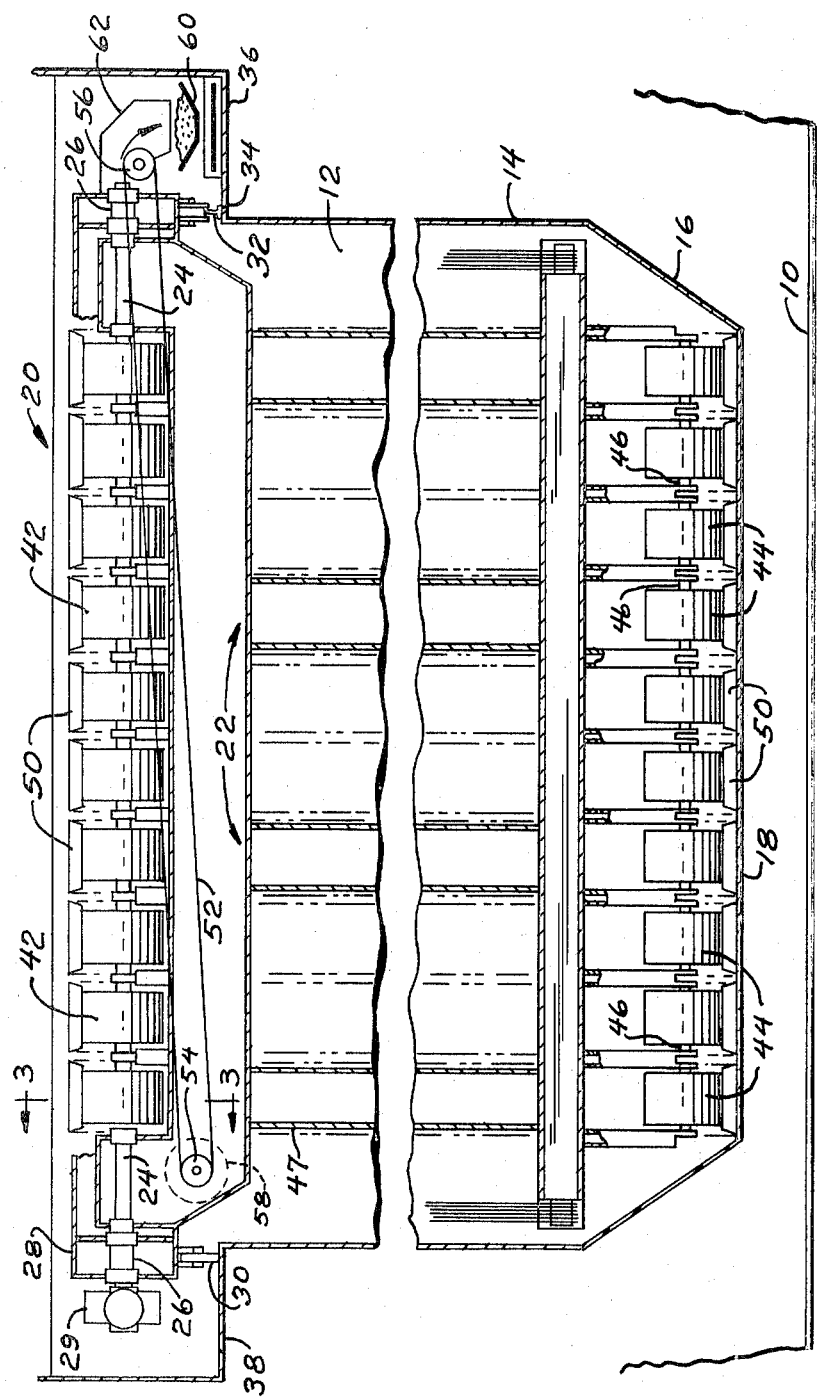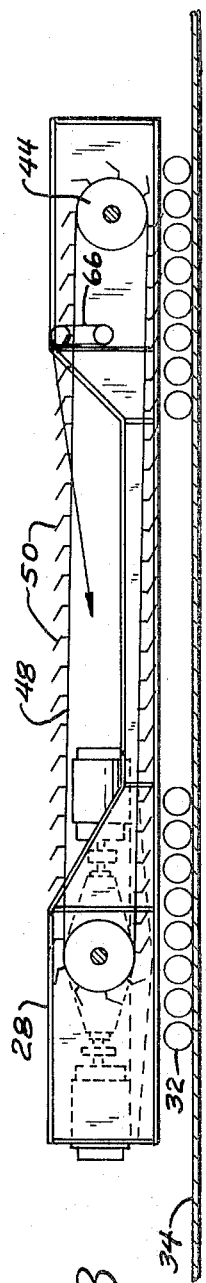

BULK SHIP UNLOADER

This is a continuation, of application Ser. No. 217,344 filed 01/12/72 now abandoned.

BACKGROUND OF THE INVENTION

Bulk cargo vessels for transporting coal, iron ore, grain, salt, crushed stone which may or may not pack hard in the hold, in recent years have been steadily increasing in size resulting in increased capacity with increased unloading time, this being especially true when the unloading equipment is dock mounted to provide ship mounted unloading equipment has been undesirable because of the space required which reduces the capacity of the vessel. Many arrangements for unloading have been suggested; for example, buckets mounted on a wheel which require much space, or bucket elevators which are vertically lowered into the bulk cargo. Problems have arisen because of the inability of the unloading or reclaiming means to reach all the bulk material.

THE INVENTION

According to this invention there is provided a bulk material handling apparatus built into the ship in a relatively small space above the hold and which is constructed to easily unload bulk material in the hold. The apparatus is constructed to begin unloading or reclaiming from the top and is constructed to follow the level of the material to the bottom of the hold. The apparatus is movable longitudinally of the hold, so as to be effective over the length of the hold.

More specifically, the bulk material unloading apparatus according to this invention comprises bucket elevator means, for example, a plurality of side-by-side bucket elevators, each arranged in their initial position longitudinally of the hold. The bucket elevators are pivoted with respect to a supporting movable trolley frame adjacent one end from an initial substantially horizontal position above the hold, i.e., their initial position to a substantially vertical position closely adjacent the bottom of the hold. Material is unloaded from the top to the bottom of the hold. The bucket elevator means discharge material into a cross-conveyor belt carried by the trolley frame supporting the bucket elevator means, the trolley frame being movable from one of the hold to the opposite end and supported by flanged wheels running on tracks supported by the ship. Along one side of the ship is a belt conveyor means which receives material from the cross conveyor and conveys the material to some location removed from the hold. This latter conveyor can be connected in any suitable manner to a dockside conveyor or other suitable collecting means.

The trolley frame carries one or more motor driven winches having steel cables for moving the frame longitudinally of the hold and an associated pulley arrangement for pivoting the bucket elevator means.

THE DRAWINGS

FIG. 1 is a longitudinal sectional view of apparatus according to this invention positioned at one end of a ship hold with the bucket elevator means shown in full lines in its lowest reclaim position and indicating highest reclaim position in broken lines;

FIG. 2 is a cross-sectional view taken on line 2—2 of FIG. 1; and

FIG. 3 is a side view of the trolley frame with the bucket elevator means in parked or initial position.

DETAILED DESCRIPTION

Referring now to the drawings, the reference character 10 indicates generally a bulk cargo ship having a hold 12 defined by sidewalls 14 which taper at 16 to join a bottom wall 18. The taper permits the bulk material to flow toward the center of the hold when unloading and prevents to some extent a residual amount of material in the hold. Above the hold is the unloading apparatus of this invention, generally identified at 20.

The unloading or reclaiming apparatus 20 comprises a plurality of side-by-side bucket elevator means 22 (a side view being shown in FIG. 1 and schematically in FIGS. 2 and 3) pivotable about a driven shaft 24 journalled in end bearings 26 supported by a trolley frame 28 which is movable longitudinally of the hold 12 of the ship. A prime mover 29 supported by the trolley frame 28 is drivingly connected to the shaft 24 for rotating the shaft.

The trolley frame 28 is constructed of structural steel shapes and is movable on a plurality of wheels 30 and 32, the wheels 32 being flanged to ride on and be guided by a track 34 supported by a horizontal ship deck portion 36 while the wheels 30 ride on an opposite ship deck portion 38. Various devices can be used to move the trolley frame 20 between one end of the hold 12 and the other end thereof. For example, a winch and rope arrangement generally identified at 40 is suitable, as are other motor means (not illustrated).

Each of the bucket elevator means 22 comprises an upper sprocket or pulley 42 connected, as by keying, to be driven by the drive shaft 24 and an idler sprocket or pulley 44 rotably journalled on a dead shaft 46 carried by an elongated frame work 47 which is freely rotably mounted at the end opposite the dead shaft on the drive shaft 24. An endless belt or chain 48 having a plurality of buckets 50 attached thereto is carried by the sprockets or pulleys 42 and 44. The buckets 50 extend substantially the width of the belt or chain 48 and are so shaped to elevate bulk material upwardly to be discharged into a cross conveyor belt 52 supported between a driving pulley means 54 and an idler pulley means 56, the driving pulley means 54 being driven by a suitable prime mover 58, supported by the trolley frame 28. The belt 52 is arranged to discharge into a longitudinal conveyor belt 60 supported by the ship portion 36. The belt 60 is supported by driving and idler pulleys as required and is arranged to convey material from the hold of the ship 10 to a suitable discharge location, as desired. A discharge chute 62 is provided over the discharge end of the belt 52, so as to insure delivery of bulk material onto the belt 60.

The bucket elevator 22 is arranged to pivot between an initial parked or rest position as shown in FIG. 3, and a substantially vertical position is shown in FIG. 1. As stated, the frame 47 is journalled for pivoting about the shaft 24. To permit such pivoting, a hoist 64 and rope and sheave arrangement 66 is used. The operation of this arrangement should be obvious to anyone skilled in the art.

The operation of the unloading or reclaiming apparatus is relatively simple. With the bucket elevator means 22 in their rest position, the prime mover 29 is energized, so that the belts or chains 48 move to the buckets 50. Using the hoist 64 and pulley arrangement 66, the bucket elevator means is lowered, so that the buckets initially contact and begin to reclaim bulk material which is discharged onto the belt 52 and thence onto the belt 60. The trolley frame 28 is moved the length of the hold to insure unloading or reclaiming of material in a somewhat layered fashion. The bucket elevators are periodically pivoted to insure collection of bulk material while the trolley is traversed the length of the hold. This sequence of operation is repeated until the bucket elevators are in their FIG. 1 position with the buckets closely adjacent the bottom 18 of the hold, insuring complete unloading of the bulk material.

I claim:

1. Ship mounted apparatus for unloading or reclaiming bulk materials from the hold thereof comprising:

a trolley frame having wheels;

tracks on said ship longitudinally and above said hold for receiving and guiding the wheels of said trolley frame;

means for moving said trolley frame longitudinally of said ship on said tracks;

said trolley frame being greater in length and width than in height above said hold;

a plurality of side-by-side bucket elevator means extending substantially the width of the hold and each comprising a plurality of buckets mounted on a movable means supported on a rigid frame;

each rigid frame being of a width less than its length and the height of said trolley frame and pivotable at one end within said trolley frame between a substantially horizontal position totally within said trolley frame and a vertical position in the hold closely adjacent the bottom thereof;

means to pivot said rigid frames from one position to the other position;

a transverse extending cross conveyor belt in said trolley frame and movable therewith positioned to receive material from said buckets and to convey said material to the side of said trolley frame, and a longitudinal conveyor belt supported by said ship to receive material from said transverse conveyor belt to convey material from said hold.

* * * * *